(12) United States Patent
Archibald et al.

(10) Patent No.: US 12,515,149 B2
(45) Date of Patent: Jan. 6, 2026

(54) LIQUID COOLING SYSTEM FILL KIT AND METHOD OF USE

(71) Applicant: Hoffman Enclosures Inc., Anoka, MN (US)

(72) Inventors: Matthew R. Archibald, Derry, NH (US); Scott Stammer, Champlin, MN (US); Richard Raisanen, Coon Rapids, MN (US); Patrick McCarthy, Columbia Heights, MN (US)

(73) Assignee: Hoffman Enclosures Inc., Anoka, MN (US)

( * ) Notice: Subject to any disclaimer, the term of this patent is extended or adjusted under 35 U.S.C. 154(b) by 31 days.

(21) Appl. No.: 18/313,283

(22) Filed: May 5, 2023

(65) Prior Publication Data

US 2023/0356119 A1    Nov. 9, 2023

Related U.S. Application Data

(60) Provisional application No. 63/338,737, filed on May 5, 2022.

(51) Int. Cl.
*B01D 29/60* (2006.01)
*B01D 29/13* (2006.01)
(Continued)

(52) U.S. Cl.
CPC ........... *B01D 29/606* (2013.01); *B01D 29/13* (2013.01); *B67D 7/02* (2013.01); *B67D 7/36* (2013.01);
(Continued)

(58) Field of Classification Search
CPC ........ B01D 29/606; B01D 29/13; B67D 7/36; B67D 7/58; B67D 7/76; B67D 7/845; B67D 7/02
(Continued)

(56) References Cited

U.S. PATENT DOCUMENTS 2,273,535 A * 2/1942 Peo .................. F25B 41/22
137/505.22
2,633,146 A * 3/1953 Witt .................. F02M 37/0029
210/171

(Continued)

FOREIGN PATENT DOCUMENTS

WO   2008/006362 A1   1/2008
WO   2016/069259 A1   5/2016
(Continued)

*Primary Examiner* — William M Mccalister
(74) *Attorney, Agent, or Firm* — Quarles & Brady LLP

(57) ABSTRACT

Embodiments of the invention provide a liquid fill kit system including a rollable cart having a frame and a plurality of wheels. A tank disposed within the frame. The fill kit further includes a fluid pump including a suction interface connection and a discharge interface connection. A filter assembly mounted within the frame. A fluid pressure regulator include a fluid outlet port, the fluid pressure regulator being configured to stop a flow of fluid when a pressure exceeds a fluid pressure threshold. In a first configuration, the suction interface connection is in fluid communication with the tank, and the discharge interface connection is in fluid communication with the filter unit, the pressure regulator, and the fluid outlet port to generate a flow of fluid through the fluid outlet port.

20 Claims, 13 Drawing Sheets

(51) Int. Cl.
  *B67D 7/02* (2010.01)
  *B67D 7/36* (2010.01)
  *B67D 7/58* (2010.01)
  *B67D 7/76* (2010.01)
  *B67D 7/84* (2010.01)

(52) U.S. Cl.
  CPC ............... *B67D 7/58* (2013.01); *B67D 7/76* (2013.01); *B67D 7/845* (2013.01)

(58) Field of Classification Search
  USPC ............................................. 137/505–505.47
  See application file for complete search history.

(56) References Cited

U.S. PATENT DOCUMENTS

| | | | | |
|---|---|---|---|---|
| 2,887,123 | A * | 5/1959 | Becker | G05D 16/107 137/505.11 |
| 3,088,487 | A * | 5/1963 | Peters | F16K 31/363 92/45 |
| 3,692,047 | A * | 9/1972 | Camp | G05D 16/0655 137/505.28 |
| 4,120,021 | A * | 10/1978 | Roush | F25B 5/02 361/698 |
| 4,203,465 | A * | 5/1980 | Rissi | F02M 65/00 137/505.16 |
| 4,305,423 | A * | 12/1981 | Adler | F16K 17/048 137/454.6 |
| 4,513,696 | A * | 4/1985 | Fujii | F01P 11/20 123/41.02 |
| 5,293,754 | A * | 3/1994 | Mizuno | H01L 23/473 165/286 |
| 5,630,935 | A * | 5/1997 | Treu | A61M 1/3643 137/505.11 |
| 6,056,008 | A * | 5/2000 | Adams | G05D 16/2095 137/492.5 |
| 6,056,009 | A * | 5/2000 | Powell | F02M 69/54 137/505.42 |
| 6,207,051 | B1 | 3/2001 | Anderson et al. | |
| 6,782,871 | B2 * | 8/2004 | McIntyre | F02M 69/54 123/514 |
| 7,043,933 | B1 * | 5/2006 | Knight | H05K 7/20345 361/689 |
| 7,310,230 | B2 * | 12/2007 | Tustaniwskyi | G01R 31/2891 361/679.48 |
| 7,508,665 | B1 * | 3/2009 | Palmer | H05K 7/2079 361/696 |
| 7,667,341 | B2 * | 2/2010 | Serdynski | F02N 11/0862 290/30 A |
| 8,171,916 | B2 * | 5/2012 | Nishibu | F02M 37/0052 137/505.14 |
| 8,254,124 | B2 | 8/2012 | Keisling et al. | |
| 8,297,067 | B2 | 10/2012 | Keisling et al. | |
| 8,297,069 | B2 | 10/2012 | Novotny et al. | |
| 8,305,757 | B2 | 11/2012 | Keisling et al. | |
| 8,387,249 | B2 | 3/2013 | Campbell et al. | |
| 8,601,827 | B2 | 12/2013 | Keisling et al. | |
| 8,693,198 | B2 | 4/2014 | Eckberg et al. | |
| 8,693,199 | B2 | 4/2014 | Eckberg et al. | |
| 8,813,513 | B2 * | 8/2014 | Simadiris | F25D 11/003 62/239 |
| 8,857,057 | B2 | 10/2014 | Campbell et al. | |
| 9,010,141 | B2 * | 4/2015 | Harrington | F28D 15/0233 62/169 |
| 9,161,480 | B2 * | 10/2015 | Harrington | H05K 7/20272 |
| 9,273,906 | B2 | 3/2016 | Goth et al. | |
| 9,282,684 | B2 | 3/2016 | Keisling et al. | |
| 9,313,930 | B2 | 4/2016 | Goth et al. | |
| 9,313,931 | B2 | 4/2016 | Goth et al. | |
| 9,763,366 | B2 | 9/2017 | Keisling et al. | |
| 9,832,913 | B2 | 11/2017 | Shedd | |
| 9,839,163 | B2 | 12/2017 | Keisling et al. | |
| 9,848,509 | B2 | 12/2017 | Shedd et al. | |
| 9,852,963 | B2 * | 12/2017 | Shedd | F28F 9/26 |
| 9,854,713 | B2 | 12/2017 | Krug, Jr. et al. | |
| 9,854,714 | B2 | 12/2017 | Shedd | |
| 9,854,715 | B2 | 12/2017 | Shedd et al. | |
| 9,861,012 | B2 | 1/2018 | Krug, Jr. et al. | |
| 9,861,013 | B2 | 1/2018 | Edwards et al. | |
| 9,891,002 | B2 | 2/2018 | Shedd et al. | |
| 9,901,008 | B2 | 2/2018 | Shedd et al. | |
| 9,901,013 | B2 | 2/2018 | Shedd et al. | |
| 9,918,409 | B2 | 3/2018 | Edwards et al. | |
| 10,088,238 | B2 | 10/2018 | Shedd | |
| 10,184,699 | B2 | 1/2019 | Shedd et al. | |
| 10,251,318 | B2 | 4/2019 | Krug, Jr. et al. | |
| 10,271,464 | B2 | 4/2019 | Krug, Jr. et al. | |
| 10,660,239 | B2 | 5/2020 | Edwards et al. | |
| 10,813,253 | B2 | 10/2020 | Lunsman et al. | |
| 10,869,412 | B2 * | 12/2020 | Chiu | H05K 7/20281 |
| 10,888,023 | B2 | 1/2021 | Lunsman et al. | |
| 10,939,589 | B2 | 3/2021 | Krug, Jr. et al. | |
| 11,039,552 | B2 | 6/2021 | Krug, Jr. et al. | |
| 11,083,110 | B2 | 8/2021 | Krug, Jr. et al. | |
| 11,096,315 | B2 | 8/2021 | Krug, Jr. et al. | |
| 11,197,397 | B2 | 12/2021 | Chiu et al. | |
| 11,452,243 | B2 | 9/2022 | Lyon et al. | |
| 12,048,128 | B2 | 7/2024 | Keisling et al. | |
| 2005/0122685 | A1* | 6/2005 | Chu | H05K 7/2079 361/689 |
| 2005/0126747 | A1* | 6/2005 | Chu | H05K 7/2079 165/11.1 |
| 2007/0193721 | A1* | 8/2007 | Tilton | F25B 43/04 165/104.19 |
| 2012/0125028 | A1 | 5/2012 | Keisling et al. | |
| 2012/0127653 | A1 | 5/2012 | Keisling et al. | |
| 2012/0127657 | A1 | 5/2012 | Keisling et al. | |
| 2012/0133256 | A1 | 5/2012 | Keisling et al. | |
| 2012/0180979 | A1* | 7/2012 | Harrington | H05K 7/20272 165/96 |
| 2012/0300391 | A1 | 11/2012 | Keisling et al. | |
| 2012/0318492 | A1 | 12/2012 | Keisling et al. | |
| 2012/0324911 | A1 | 12/2012 | Shedd | |
| 2012/0325436 | A1 | 12/2012 | Shedd | |
| 2013/0047653 | A1 | 2/2013 | Keisling et al. | |
| 2015/0068621 | A1* | 3/2015 | Conner | F16K 1/46 137/557 |
| 2015/0192368 | A1 | 7/2015 | Shedd et al. | |
| 2015/0195958 | A1 | 7/2015 | Keisling et al. | |
| 2015/0233619 | A1 | 8/2015 | Shedd | |
| 2015/0237767 | A1 | 8/2015 | Shedd et al. | |
| 2015/0257303 | A1 | 9/2015 | Shedd | |
| 2016/0116218 | A1 | 4/2016 | Shedd et al. | |
| 2016/0116222 | A1 | 4/2016 | Shedd et al. | |
| 2016/0116224 | A1 | 4/2016 | Shedd et al. | |
| 2016/0120019 | A1 | 4/2016 | Shedd et al. | |
| 2016/0120059 | A1 | 4/2016 | Shedd et al. | |
| 2016/0120065 | A1 | 4/2016 | Shedd et al. | |
| 2016/0120071 | A1 | 4/2016 | Shedd et al. | |
| 2016/0128238 | A1 | 5/2016 | Shedd et al. | |
| 2017/0079165 | A1 | 3/2017 | Keisling et al. | |
| 2017/0105313 | A1 | 4/2017 | Shedd et al. | |
| 2019/0141861 | A1 | 5/2019 | Shedd et al. | |
| 2020/0107475 | A1 | 4/2020 | Keisling et al. | |
| 2022/0071063 | A1 | 3/2022 | Heydari | |
| 2022/0408615 | A1 | 12/2022 | Lyon et al. | |
| 2023/0284422 | A1 | 9/2023 | Heydari | |
| 2023/0356119 | A1* | 11/2023 | Archibald | B67D 7/36 |
| 2024/0175611 | A1 | 5/2024 | Shedd et al. | |

FOREIGN PATENT DOCUMENTS

| | | |
|---|---|---|
| WO | 2016/069271 A1 | 5/2016 |
| WO | 2016/069285 A1 | 5/2016 |
| WO | 2016/069295 A1 | 5/2016 |
| WO | 2016/069299 A1 | 5/2016 |
| WO | 2016/069313 A1 | 5/2016 |
| WO | 2016/069354 A1 | 5/2016 |

(56) References Cited

FOREIGN PATENT DOCUMENTS

| | | |
|---|---|---|
| WO | 2016/069380 A1 | 5/2016 |
| WO | 2016/069414 A1 | 5/2016 |
| WO | 2016/069417 A1 | 5/2016 |

\* cited by examiner

LIQUID COOLING SYSTEM FILL KIT AND METHOD OF USE

CROSS REFERENCE TO RELATED APPLICATIONS

This application claims priority to U.S. Provisional Patent Application No. 63/338,737 filed May 5, 2022, the entirety of which is incorporated by reference.

BACKGROUND

Several trends in the electronics industry have combined to increase the importance of thermal management, including heat removal for electronic components. In particular, the need for faster and more densely packed circuits has had a direct impact on the importance of thermal management. For example, power dissipation and heat production increase as device operating frequencies increase. Also, increased operating frequencies may be possible at lower device junction temperatures. Further, as more and more components are packed onto a single chip or module, heat flux increases, resulting in the need to remove more power from a given size chip or module. These trends have combined to create applications and environments where it is no longer desirable to remove heat solely by traditional air-cooling methods. Such air-cooling techniques are inherently limited in their ability to extract heat from electronic components with moderate to high power density.

Modern computing workloads, data generation, and data consumption have increased demand for computing capacity. To address these needs, data centers house electrical computing systems which can include hardware for networking, computing, and storage for example, and can host workloads and store data. In operation, these electrical components generate considerable heat, which can degrade the performance of computing systems and lead to overheating. To address the inefficiencies caused by overheating, cooling systems are provided for data centers to transfer heat away from electrical components, increasing the lifetime and productivity of the electrical system. In some cases, cooling systems for data centers can include coolant loops whereby liquid coolant is delivered to the electrical components requiring cooling and the liquid coolant transfers heat away from the electrical components by flowing out of the particular component. The liquid coolant can flow through a cooling unit, where the liquid coolant can be cooled and recirculated back to the electrical components to cool the electrical components.

SUMMARY

Embodiments of the invention provide a liquid fill kit system including a rollable cart having a frame and a plurality of wheels. A tank can be disposed within the frame. The liquid fill kit can further include a fluid pump including a suction interface connection and a discharge interface connection. A filter assembly can be mounted within the frame. A fluid pressure regulator can include a fluid outlet port, and the fluid pressure regulator being configured to stop a flow of fluid when a pressure exceeds a fluid pressure threshold. In a first configuration, the suction interface connection can be in fluid communication with the tank, and the discharge interface connection can be in fluid communication with the filter unit, the pressure regulator, and the fluid outlet port to generate a flow of fluid through the fluid outlet port.

BRIEF DESCRIPTION OF FIGURES

Various figures are presented in line with the text below to provide context for general and specific discussion of liquid cooling system fill kits (hereinafter "fill kit") and components thereof. In addition, the numbered figures described below illustrate liquid cooling system fill kits and related sub-systems according to different embodiments of the invention.

DETAILED DESCRIPTION

Figure 1:
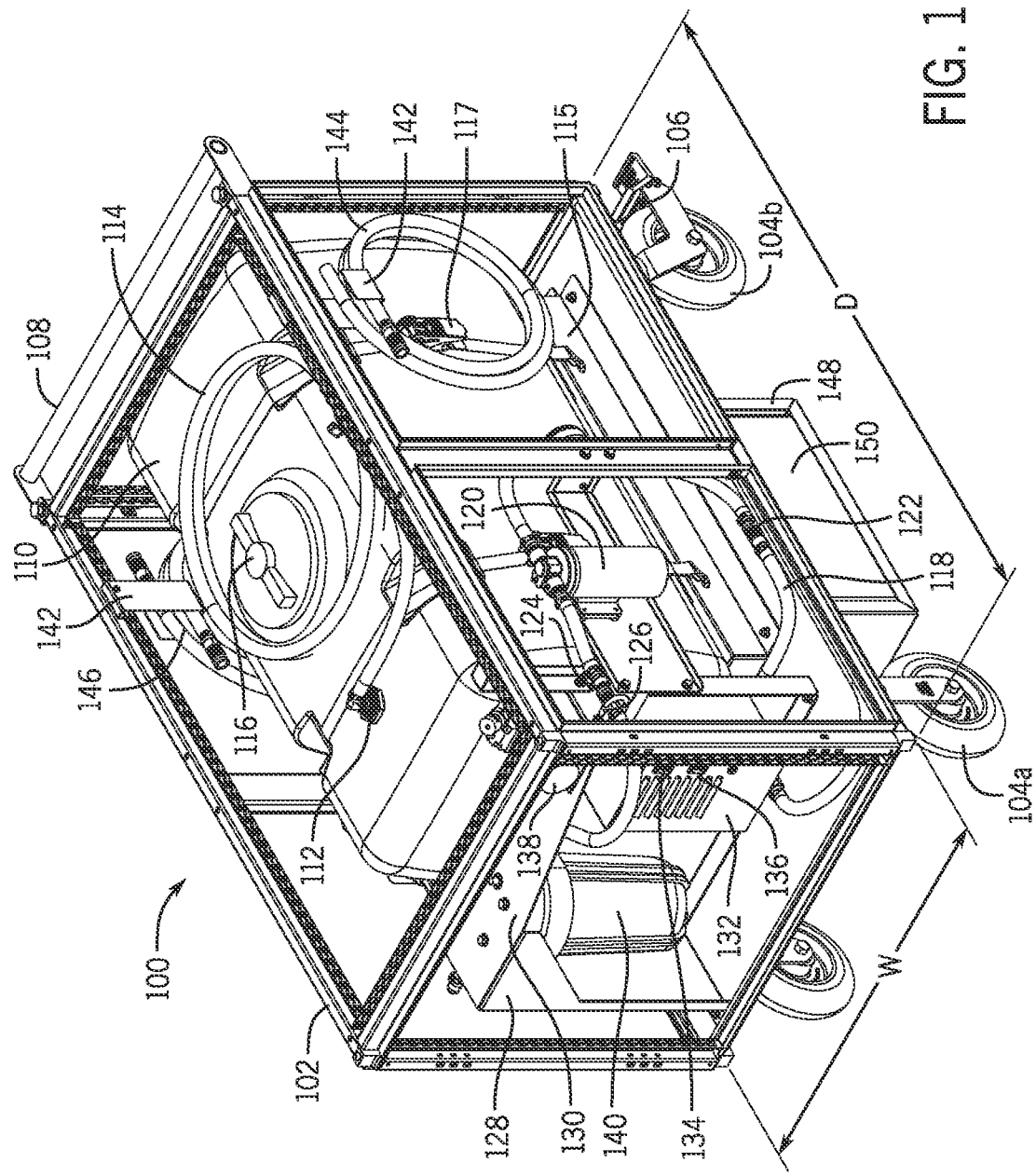
FIG. 1 is a front, right isometric view of a liquid cooling system fill kit ("fill kit") according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of" For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, the terms "about" and "approximately" refer to a range of values ±5% of the numeric value that the term precedes. As a default the terms "about" and "approximately" are inclusive to the endpoints of the relevant range, but disclosure of ranges exclusive to the endpoints is also intended.

Also as used herein, unless otherwise limited or defined, "integral" and derivatives thereof (e.g., "integrally") describe elements that are manufacture as a single piece without fasteners, adhesive, or the like to secure separate components together. For example, an element stamped as a single-piece component from a single piece of sheet metal, without rivets, screws, or adhesive to hold separately formed pieces together is an integral (and integrally formed) element. In contrast, an element formed from multiple pieces that are separately formed initially then later connected together, is not an integral (or integrally formed) element.

Also as used herein, unless otherwise defined or limited, the term "lateral" refers to a direction that does not extend in parallel with a reference direction. A feature that extends in a lateral direction relative to a reference direction thus extends in a direction, at least a component of which is not parallel to the reference direction. In some cases, a lateral direction can be a radial or other perpendicular direction relative to a reference direction.

Also as used herein, unless otherwise defined or limited, the term "identical" indicates components or features that are manufactured to the same specifications (e.g., as may specify materials, nominal dimensions, permitted tolerances, etc.), using the same manufacturing techniques. For example, multiple parts stamped from the same material, to the same tolerances, using the same mold may be considered to be identical, even though the precise dimensions of each of the parts may vary from the others.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

A liquid cooling loop including liquid coolant can be a closed circuit, disconnected from a supply of water or coolant from a facility. For example, providing isolated liquid cooling circuits can allow for greater control of liquid properties within a loop (e.g., temperature, purity, etc.), and can prevent introduction of impurities from a facility. In some cases, isolating a liquid cooling loop can prevent insertion of air bubbles in piping elements along the loop, as can damage components along the loop (e.g., pumps), and degrade a cooling efficiency. Further, components along a liquid cooling loop (e.g., manifolds, cabinets of liquid-cooled electrical equipment, heat exchangers, coolant distribution units, pumping units, rear-door heat exchangers, etc.) can be modularly added or removed from the loop in accordance with a demand for compute capacity or cooling capacity.

In some cases, it can be advantageous to fill (e.g., to charge) a component with a liquid coolant before connecting the component to a liquid cooling loop. Components to be installed along a liquid cooling circuit (e.g., in a flow path of a liquid coolant) can be provided with quick-disconnect port which may be exposed on an outer side of the component and may be in fluid communication with piping and hosing within the component that are configured to receive (e.g., to transport) the liquid coolant. The port can engage (e.g., can receive or be received into) a corresponding quick-disconnect fitting connected to a fluid reservoir, and fluid can be provided to the component from the reservoir to fill the component before introduction of the component into a liquid cooling circuit. In some cases, filling a component can also include purging air from fluid flow elements (e.g., piping, hosing, pumps, heat exchangers, manifolds, servers, etc.) to ensure that air is not introduced into the liquid cooling circuit when the component is connected thereto.

In some cases, a liquid cooling circuit can experience a leakage of fluid during operation, and it can be necessary to recharge the liquid cooling circuit and components along the liquid cooling circuit with a liquid coolant. Thus, cabinets containing components along a liquid cooling circuit can include ports for filling or draining a liquid from the cabinet and individual components housed therein. The port can be exposed at side of a cabinet facing a hot aisle or a side of the cabinet facing a cold aisle. In some cases, a space between rows of electrical cabinets within a data center (e.g., a width of a cold or hot aisle) can be about 3 feet, about 4 feet, about 5 feet, etc.

The systems and methods disclosed herein can provide improvements over some conventional systems and methods for filling components along a liquid cooling circuit within a data center. For example, the liquid fill kits disclosed herein can include a cart containing equipment for filling, draining, purging, or refilling liquid cooled components in a data center. In some cases, dimensions of the liquid fill kit can allow for on-site servicing of equipment along a liquid cooling circuit (e.g., without removing the equipment from the liquid cooling circuit for servicing). As shown in FIG. 1 a liquid fill kit 100 can be provided comprising a cart containing equipment to facilitate filling, draining, purging, or refilling of liquid cooled components. In some cases, the fill kit 100 can include a frame 102 to provide structure for containing equipment of the fill kit, and structure for mounting components along the fill kit. In the illustrated embodiment, the frame 102 does not enclose the equipment of the kit (e.g., the frame 102 does not include paneling or other elements to shield all or a portion of the equipment from view). However, in other embodiments, panels can be provided to at least partially enclose a frame of a liquid fill kit.

The liquid fill kit can further include elements to provide mobility of the liquid fill kit. For example, wheels 104 (e.g., casters) can be provided at a bottom of the fill kit 100 to allow a rollable transportation of the fill kit within a data center or other space. In the illustrated embodiment, a rotational axis of the wheels are fixed relative to the frame 102, while rear wheels 104b are pivotable (e.g., the wheels can rotate 360 degrees relative to the frame 102) to allow for a turning of the fill kit 100 during transportation. Wheels of a fill kit can also include braking mechanisms to prevent a movement of the fill kit, as, for example, when the fill kit has been moved to an operational location at which filling of components is to be performed. As shown, the rear wheels 104b can include brakes 106, which can be selectively engaged or disengaged by a user (e.g., with a foot of a user) to fix the fill kit in place or allow a rolling of the fill kit. In some embodiments, brakes can be provided on front wheels of a fill kit. In some cases, front wheels of a fill kit can also be pivotable about a connection to the frame to allow greater degrees of freedom and smaller turning radii for the fill kit when rolling the fill kit within a data center or other space. As illustrated, the fill kit 100 can further include a handle 108 fixed to the frame 102 to provide an engagement point for a user to push or steer the fill kit 100. In some embodiments, a handle of a fill kit can be provided at different vertical points along the fill kit, or at a different side of the fill kit. In some cases, a handle is not fixed directly to the frame, but is attached to other structural elements of a fill kit (e.g., including panels of an enclosed fill kit).

A fill kit can be sized to be maneuverable within aisles of a data center (e.g., hot aisles, cold aisles, etc.). Thus, a width of the fill kit can be less than an aisle width and can allow for clearance between the fill kit and rows of electrical equipment defining the aisle. In some cases, cold aisles can define a minimum width of about 1.2 meters. In the illustrated embodiment, the fill kit 100 can have a maximum width W of less than about 750 mm, as can provide a clearance of greater than 400 mm for the fill kit 100 within a row of the data center. In some embodiments, a fill kit may have a width of less than 700 mm, less than 650 mm, less than 600 mm, between about 600 to about 700 mm, between about 700 mm to about 750 mm. A total length L of the fill kit can be about 1300 mm, between about 1300 mm to about 1400 mm, or between about 1200 mm to about 1300 mm.

Figure 2:
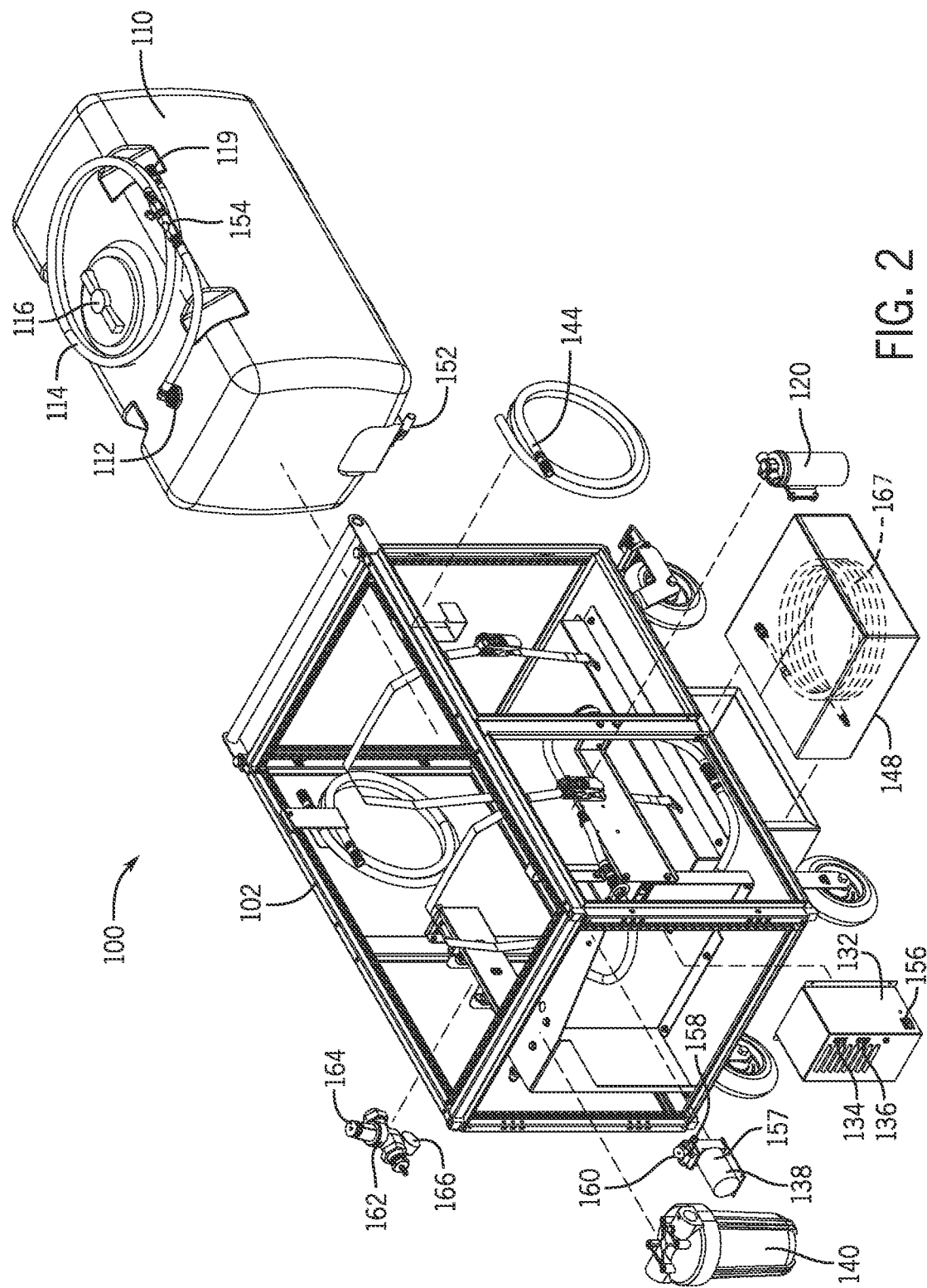
FIG. 2 is an exploded isometric view of the fill kit of FIG. 1.
Figure 3:
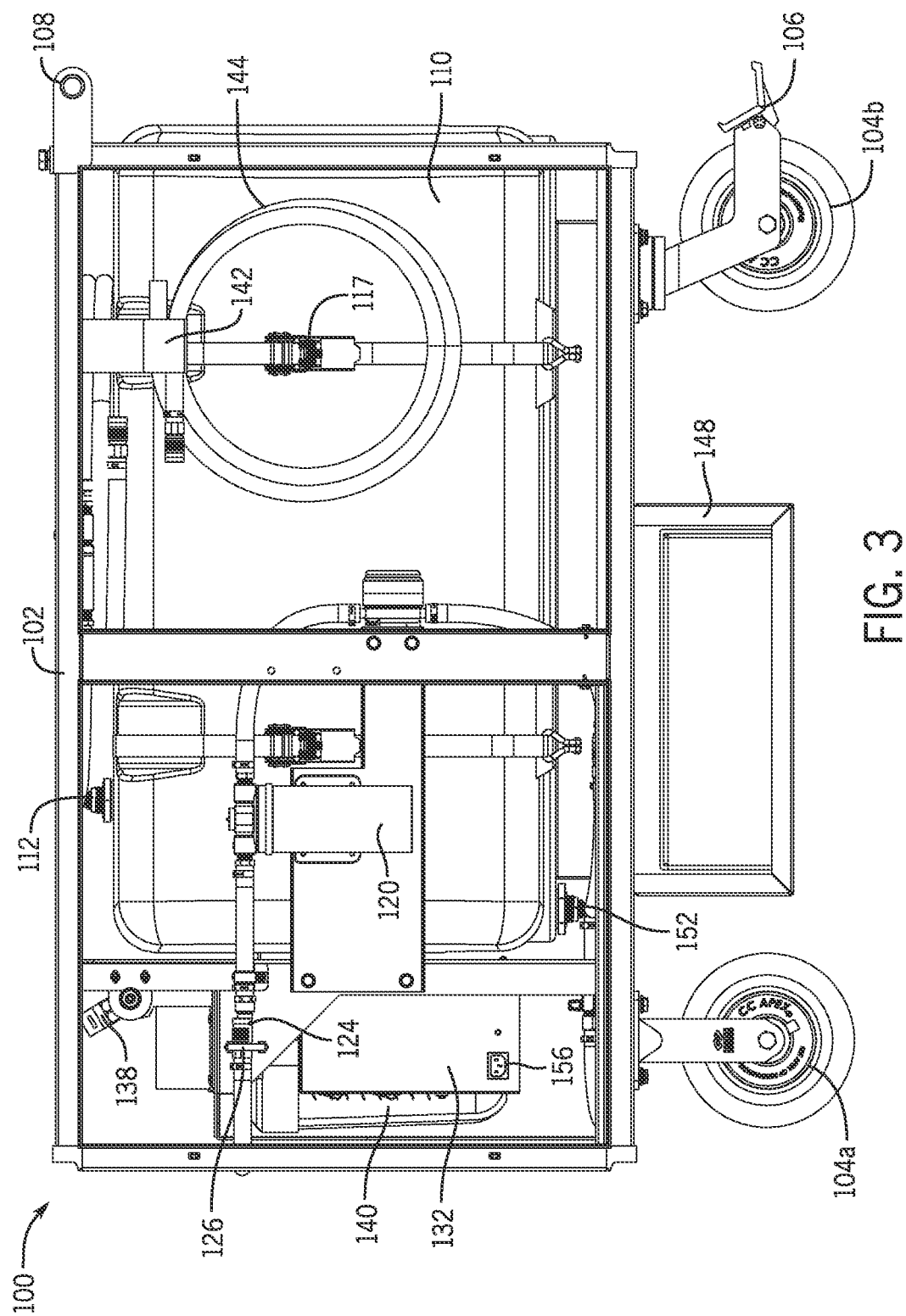
FIG. 3 is a right elevation view of the fill kit of FIG. 1.
Figure 11:
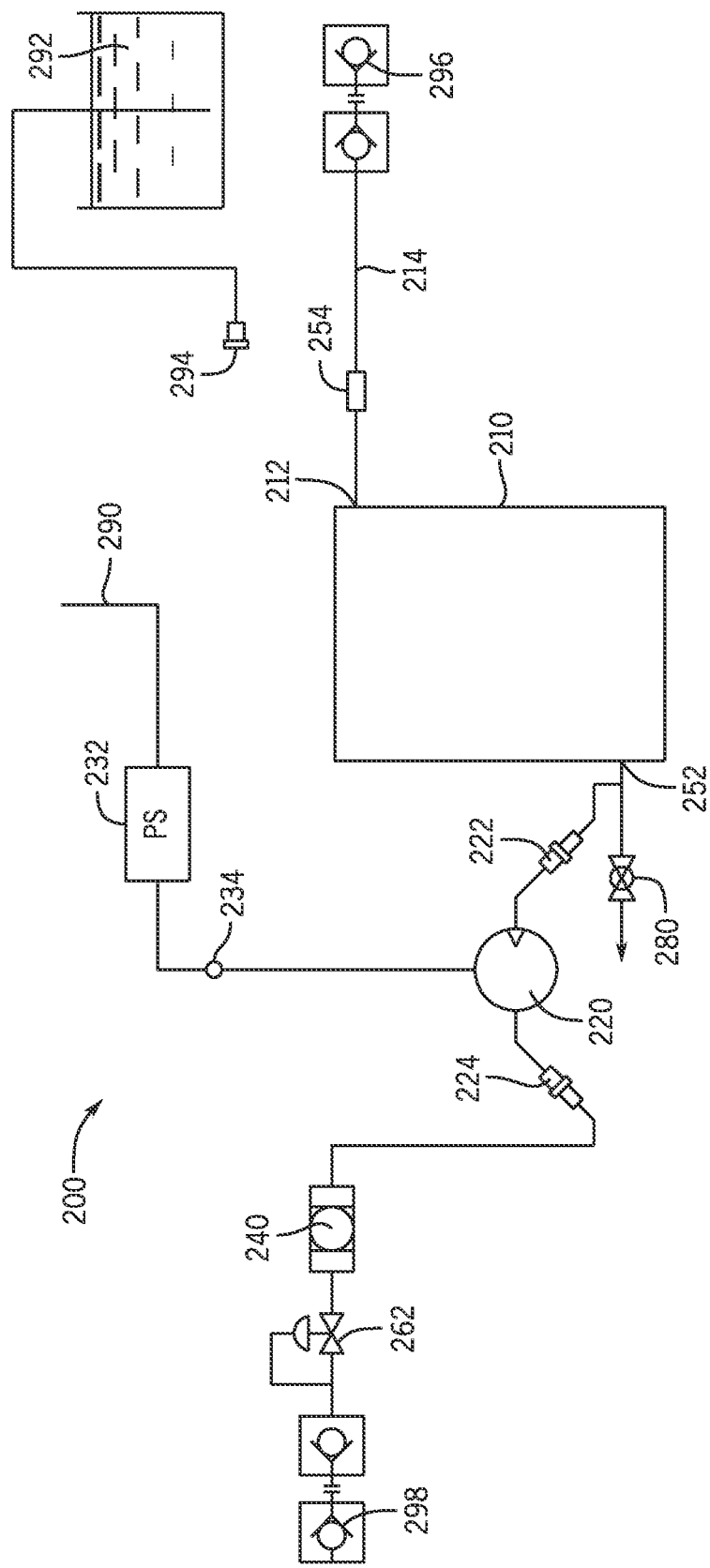
FIG. 11 is a schematic illustration of a fill kit, according to an embodiment of the invention.

A fill kit can include a reservoir (e.g., a tank) to allow filling of components within a data center without the need to connect to a facility water supply. A reservoir for a fill kit can define a volume with the capacity to fill a single component along a liquid cooling circuit (e.g., a pumping unit), a cabinet of components along a liquid cooling circuit, or multiple cabinets of electrical components. In some cases, it can be desirable to provide a reservoir with capacity to fill multiple liquid-cooled components, as can improve an efficiency of filling operations. As shown, the fill kit 100 can include a tank 110 contained within the frame 102. The illustrated tank is a 50-gallon tank, as can provide liquid coolant for at least two cabinets of fluid filled components. In some cases, a tank of a fill kit can include a volume of about 20 gallons, between about 20 gallons and 30 gallons, between 30 gallons and 40 gallons, between 40 gallons and 50 gallons, between 50 gallons and 60 gallons, etc. The tank 110 can include a fluid inlet 112 for receiving a fluid. The fluid inlet can be fluidly connected to an inlet hosing for the fill kit 100. In some embodiments, the inlet hosing can have a diameter of about ½ inch. In some cases, the hose 114 can be connected to a reservoir to fill the tank 110 (e.g., as described in FIG. 12. In some cases, fluid drained can be drained from components along a liquid cooling circuit into the tank 110 and can enter the tank 110 through the fluid inlet 112 (e.g., via the hose 114). In some cases, including during a purge of components (e.g., as shown in FIG. 11), the tank 110 can receive fluid at the fluid inlet 112 via the hose 114. In some cases, a tank includes a cap to allow filling of the tank with hosing of a facility or with other fluid delivery systems (e.g., buckets, canisters, etc.). As illustrated, the tank 110 further includes a cap 116, which can be removed (e.g., by unscrewing the cap) to expose a filling aperture into which fluid can be received into the tank 110. As illustrated in FIG. 2, a tank can include a fluid outlet 152 from which fluid can flow from the tank (e.g., can be pumped, drained, etc.). As shown, the fluid outlet can be positioned at a bottom of the tank 110, which can provide a pressure to induce flow of fluid from the tank 110 to downstream loads (e.g., components to be cooled).

Figure 4:
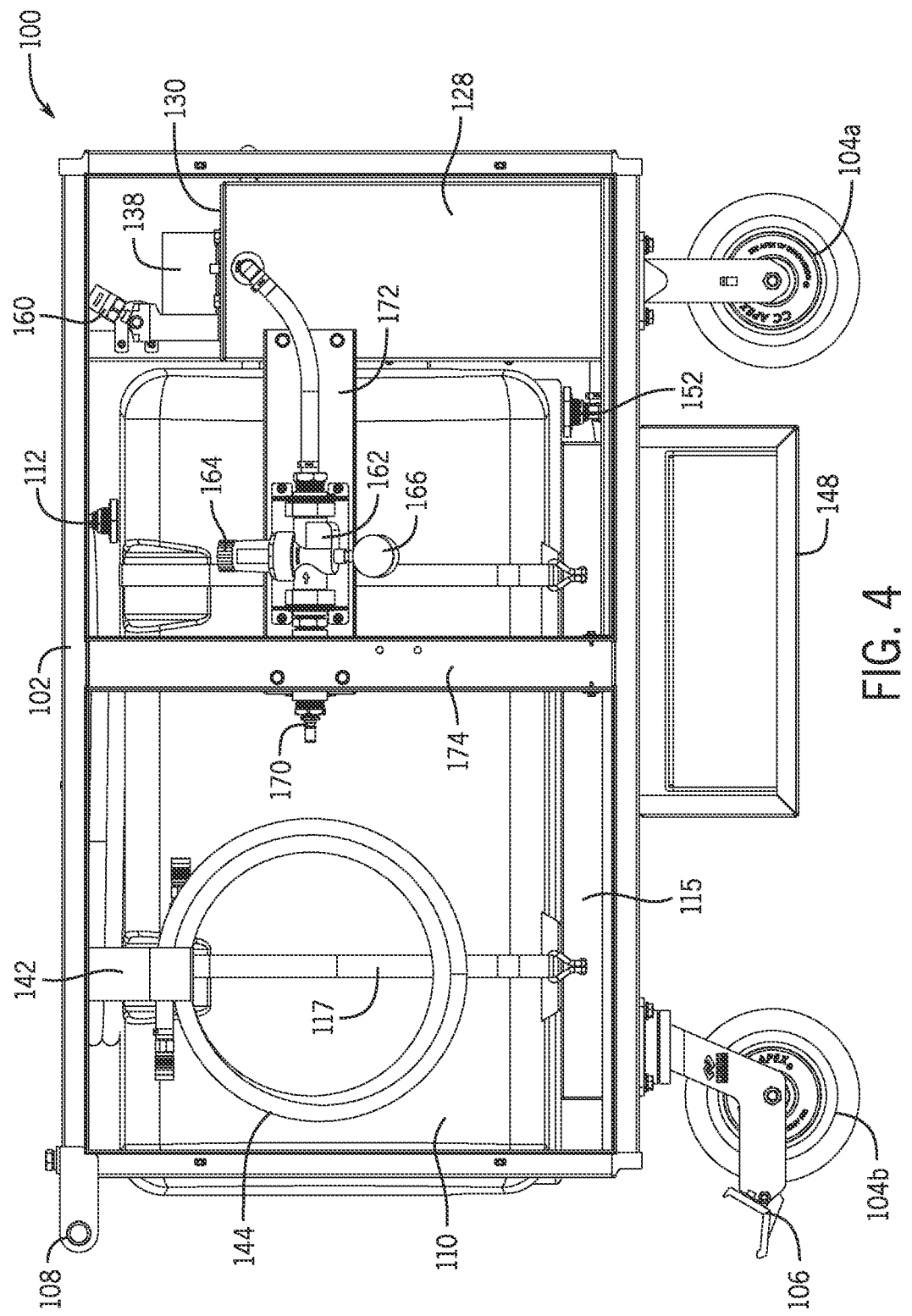
FIG. 4 is a left elevation view of the fill kit of FIG. 1.
Figure 6:
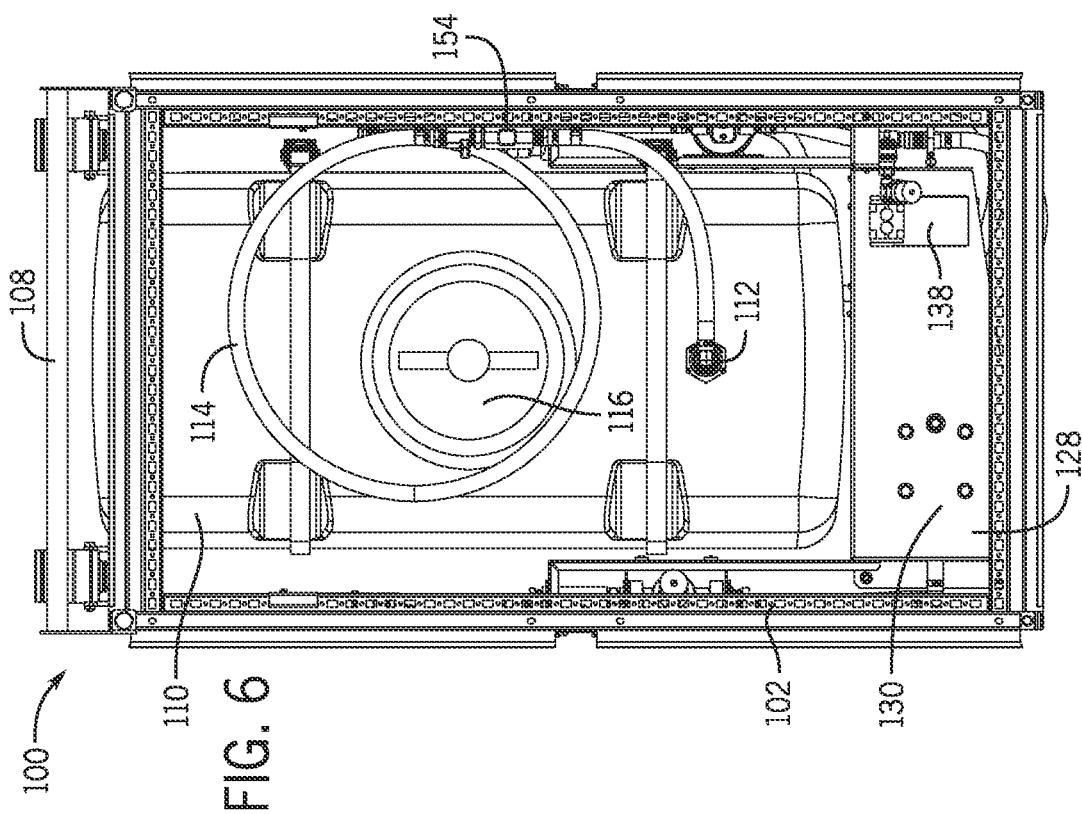
FIG. 6 is a top plan view of the fill kit of FIG. 1.
Figure 5:
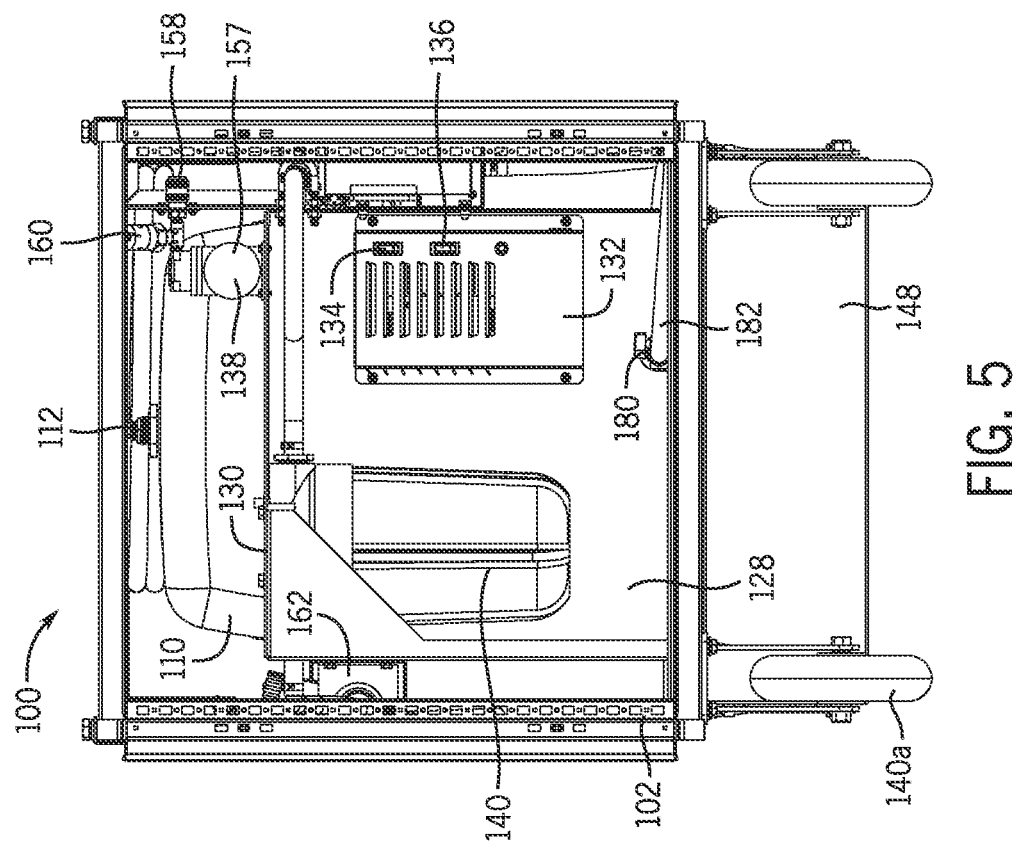
FIG. 5 is a front elevation view of the fill kit of FIG. 1.

In some cases, a frame of a fill kit can include features for retaining a fill tank in place within the fill kit. For example, it can be advantageous to configure a fill kit to allow for toolless removal and replacement of a tank. As shown in FIG. 1, the fill kit can include upstanding retention plates 115 to retain the tank 110 relative to the frame 102. Straps 117 can extend around the tank 110 from a retention plate 115 on a first lateral side of the fill kit 100 to a retention plate on a second lateral side of the fill kit (e.g., as shown in FIG. 4). Other configurations are possible, and in some cases, a fill tank can be seated on or along retention features of a fill kit with a gravitational force of the tank preventing a vertical displacement thereof.

Filling and draining operations of a fill kit can require a liquid pump to provide pressure for generating a flow of fluid through the fill kit (e.g., for filling liquid cooled components, filling a tank of the fill it, draining fluid from liquid cooled components, performing air purge operations, etc.). As further illustrated in FIG. 1, the liquid fill kit can include a pump 120 for pumping a fluid through hosing of the fill kit 100 and downstream fluid flow components. As shown, the pump 120 can be mounted at a lateral side of the frame 102. However, a pump of a fill kit can be otherwise positioned, including, for example, proximate to a fluid outlet of a tank (e.g., the fluid outlet 152 of the tank 110 shown in FIG. 2). For example, in some cases, it can be advantageous to position a pump of a fill kit at a similar vertical height as an outlet of a reservoir, as can minimize a pressure drop in piping or hosing connecting the pump to the tank. Other configurations are possible, however, and a pump of a fill kit can be mounted at a front side, a back side, along a top, or along a bottom of a fill kit.

As shown, the pump 120 can be connected to hosing of the fill kit, or hosing of other fluid systems (e.g., a reservoir, liquid-filled components, etc.) at a suction-side connection interfaces 122 and a discharge-side connection interface 124. In the illustrated embodiment, each of the interfaces 122, 124 comprise quick-disconnect fittings, to allow toolless connection or disconnection with hosing of the fill kit 100 or other fluid components. In the illustrated embodiment, the suction-side connection interface 124 is fluidly connected to the fluid outlet 152 of the tank 110, and the discharge-side connection interface 124 is fluidly connected to downstream fluid flow elements (e.g., filter 140, and pressure regulator 162 shown in FIG. 2), so that the pump 120 operates to pump fluid from the tank 110 to components for fluid fill (e.g., charging), refill (e.g., top off) and air purge operations. In other configurations, including as illustrated in FIGS. 1-13, the pump can operate to pump fluid to perform other operations. For example, the suction-side connection interface 122 can be connected to hosing from a reservoir, and the discharge-side connection interface 124 can be fluidly connected to hose 114 (e.g., to fluid inlet 112 of the tank 110) to implement a tank filling mode. In some configurations, the interfaces 122, 124 can include any known quick disconnect (e.g., quick connect) fittings to allow toolless connection with upstream hosing and downstream hosing to implement different modes of operation (e.g., filling, draining, purging, refilling, self-filling, etc.). In some cases, the pump can be rated to receive a voltage of direct current voltage of 12V and can comprise any known pumps for pumping a fluid.

As further shown in FIG. 1, the fill kit 100 can include structures for retaining and fixing hoses in place along the frame 102 of the fill kit. For example, in the illustrated embodiment a bracket 126 is fixed to the frame and retains hosing of the fill kit upstream of the pump 120 (e.g., hosing that can be directly connected to the discharge-side connection interface 124 in some modes of operation). Fixing hosing elements can reduce a wear on the hose by reducing a deformation on the hose, in particular where the hose is configured to selectively connect or disconnect with other elements of a fill kit.

In some embodiments, a fill kit can include filtration systems to remove particulate matter and impurities from a fluid before the fluid enters downstream components (e.g., manifolds, pumping units, heat exchangers, in-row coolant distribution units, server racks, servers, etc.). For example, as illustrated, the fill kit 100 can include a filter unit 140 for filtering a fluid to be provided to components to be filled. In the illustrated embodiment the filter unit 140 include a 50-micron canister filter (e.g., for filtering particulate matter from a fluid having a size of 50 microns or greater). In other embodiments, other filter types can be used, and can include filters for filtering particles of different sizes. For example, a filter unit of a fill kit can include y-strainer, a basket strainer, or any other filter type configured to remove particulate matter from a fluid. In some examples, a filter unit can include a 10-micron filter, a 25-micron filter, a 50-micron filter, a 75-micron filter, a 100-micron filter, or any other known filter size.

The fill kit 100 can include a mounting structure 128 for mounting elements of the fill kit 100. As shown, the mounting structure can include one or more mounting surfaces 130 (e.g., sheet metal surfaces) to which elements of the fill kit can be mounted or fixed. For example, the filter unit 140 can be fixed to the mounting surface 130 of the mounting structure 128 (e.g., with fasteners, which can include bolts, screws, etc.). The mounting structure 128 (e.g., mounting surfaces of the mounting structure) can provide horizontal mounting surfaces (e.g., mounting surface 130) and vertical mounting surfaces for vertically mounting an element of the fill kit 100. As further shown, for example, a power supply unit 132 (e.g., as further described below) can be mounted to the mounting structure 128 within the frame 102. In some embodiments, a horizontal mounting surface 130 can be a working surface of the fill kit. For example, individual components of a liquid cooling circuit (e.g., a pump cartridge, a pumping unit, a server shelf) can be charged separately from a cabinet and can be placed on the mounting surface 130 for convenience of the operator performing the filling operation. In some cases, a mounting structure can include features for providing greater working surface areas for filling operations of components of a liquid cooling circuit. For example, a mounting surface (e.g., a working surface) can include slide-out extensions to increase a surface area available for placing liquid cooled components during a fill operation. A working surface can include fold-out extensions in some embodiments. In some cases, a panel on a top of the filling unit can provide a working surface for the fill kit.

In some cases, piping of a component to be filled can be rated for a given fluid pressure, and if a fluid pressure within the component exceeds a threshold pressure, elements (e.g., piping) of the component can be damaged. In some cases, overpressure in a component can cause fluid leakage at points of the component (e.g., at connection interfaces). Further, in some cases, it can be inefficient for an operator of a fill kit to monitor the fill kit during a filling operation (e.g., where a filling operation requires a longer period of time) and requiring an operator to monitor a pressure and stop a filling operation manually can provide an opportunity for error which can lead to overpressure of a component. Thus, it can be advantageous to include pressure regulation systems for a fill kit to automatically end a filling of a component when a threshold pressure is exceeded. In this regard, FIG. 4 illustrates a pressure regulator 162, which, in the illustrated embodiment is immediately downstream of the filter unit 140. The pressure regulator 162 can include a gauge display 166 for displaying a pressure measurement of a fluid flowing through the pressure regulator 162. The pressure regulator 162 can further include a knob 164 which is rotatable by an operator to set a maximum pressure fluid flowing through the pressure regulator. For example, an operator can rotate the knob 164 in a clockwise direction to increase a pressure threshold for a filling operation and can decrease a pressure threshold by rotating the knob in a counter-clockwise direction. In some embodiments, a fill kit can include any known pressure regulation components configured to automatically regulate a pressure in response to a user-set pressure threshold. In some cases, a pressure regulator can be electronically powered, and a user can set a pressure at a user interface of a fill kit (e.g., a control panel, a screen, etc.). The pressure regulator can include an output port 170 to provide fluid to downstream components. As shown, the output port 170 can comprise a quick disconnect fitting which can be connected to hosing including disconnect fittings for connection to components to be charged. In some embodiments, a fill kit can be configured to fill multiple components at a given point in time, each component having a similar rated pressure. For example, in some cases, a manifold (not shown) can be fluidly connected to a pressure regulator of a fill kit, and can provide multiple output ports (e.g., 2 output ports, 3 output ports, 4 output ports, 5 output ports, 6 output ports, or more than 6 output ports). In some cases, the manifold can be fixed to a frame of the fill kit. In some cases, a manifold of a fill kit can be configured to include inlet ports in fluid communication with an inlet of a tank of the fill kit, to allow purge and drain operations of multiple components simultaneously.

As further shown in FIG. 4, the pressure regulator can be mounted to the frame 102 with a dedicated mounting bracket 172. The mounting bracket can be a sheet metal mounting bracket and can be fixed on one end to the mounting structure 128, and on an opposite end to a vertical support member 174 of the frame 102. In other configurations, the pressure regulator can be mounted directly onto a member of the frame 102 (e.g., vertical support member 174, a base plate of the frame, etc.). In some embodiments, the pressure regulator can be mounted directly onto a mounting structure (e.g., the mounting structure 128) proximate to a filter unit immediately upstream of the pressure regulator, as can reduce a total length of hosing required for the fill kit.

Referring back to FIG. 1, a fill kit 100 can include storage elements for storing equipment that can be used in operation of the fill kit (e.g., hoses, tooling, piping, spare parts, etc.). For example, as shown, the fill kit 100 can include hose retention brackets 142 on a first and second lateral side of the fill kit, mounted to the frame 102. The hose retention brackets can be configured (e.g., sized and positioned) to receive a coil (e.g., a coil of hosing, or an extension cord or other wiring), and to store the coil for easy access of a user of the fill kit 100. In the illustrated embodiment, a hose 144 is stored at a hose retention bracket 142 on the first lateral side of the fill kit 100, and hose 146 is stored on a hose retention bracket 142 on the second lateral side of the fill kit 100. As further shown, a storage compartment 148 can be provided at a bottom portion of the fill kit 100. The storage compartment 148 can include a removable panel 150 for retaining items in the storage compartment 148. In some embodiments, a storage compartment of a fill kit can include one or more drawers to store equipment for the fill kit. For example, the storage compartment 148 can be divided into separate compartments for different equipment in some embodiment. In some embodiments, a storage compartment can include one or more drawers for storage and organization of equipment for the storage compartment 148. In the illustrated embodiment, as shown in FIG. 2, the storage compartment 148 includes a single compartment, and stores an air hose 167 for use with an air compressor (e.g., air compressor 138 described below).

Figure 7:
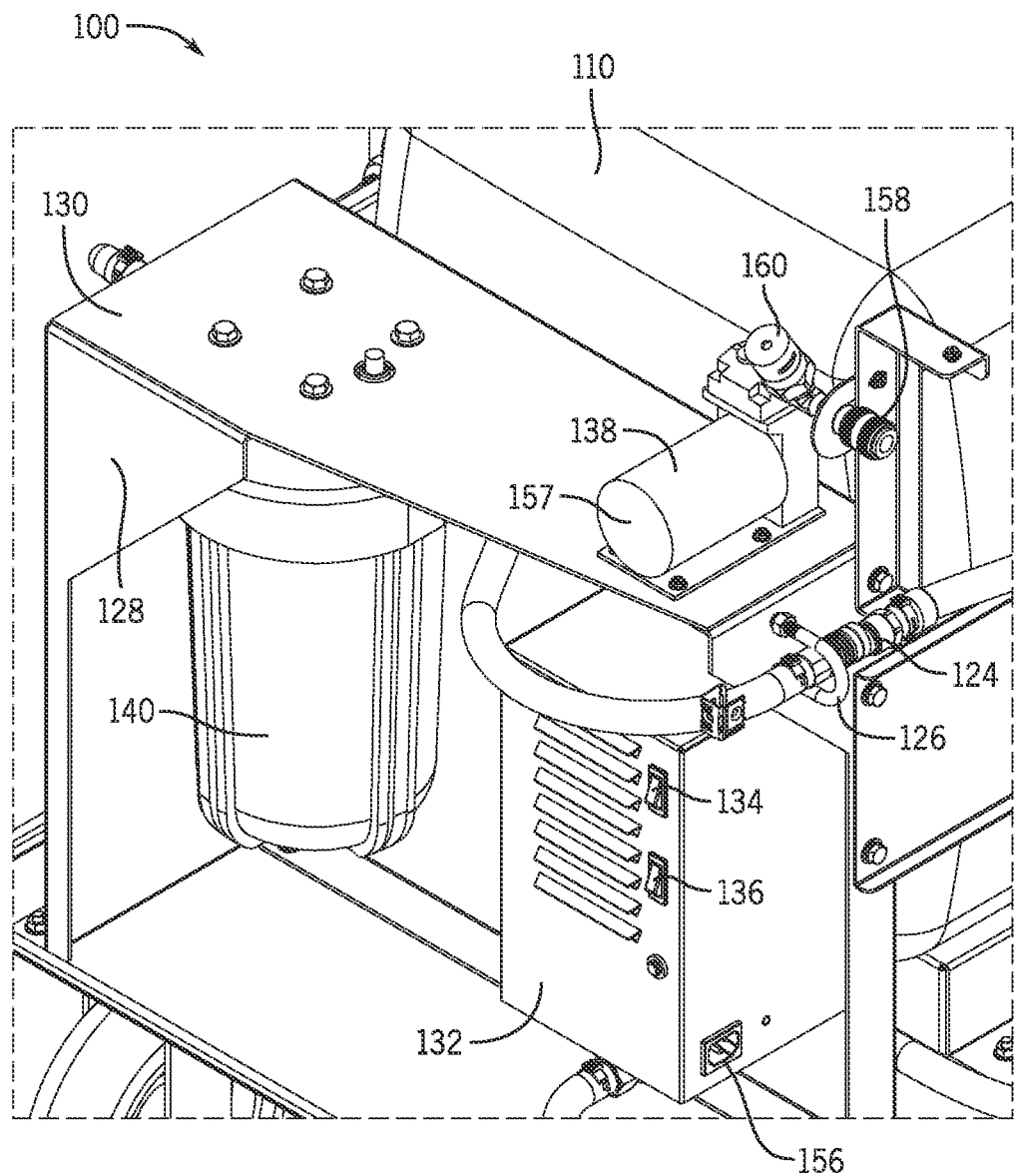
FIG. 7 is a partial front isometric view of the fill kit of FIG. 1, with rails of a frame of the fill kit removed.

In some cases, elements along a liquid cooling circuit include components that can use a pressurized air to regulate pressure within the liquid cooling circuit. For example, expansion tanks (e.g., internal bladder expansion tanks) can include a bladder separating a pressurized air and a fluid from the liquid cooling circuit. When the fluid expands or a pressure of the fluid otherwise increases, a pressure of the fluid can exceed a pressure of the pressurized air, and the expansion tank can receive fluid to relieve a pressure along the liquid cooling circuit. Expansion tanks can include interfaces for charging the expansion tank with pressurized air to a rated pressure to maintain a pressure in the liquid cooling circuit below the rated pressure. A fill kit can include elements for charging or recharging components of a liquid cooling circuit with a pressurized air. For example, as shown in FIGS. 1-7, an air compressor 138 can be provided in the liquid fill kit 100 for charging expansion tanks of a liquid cooling circuit with pressurized air. As shown in FIG. 7, the air compressor can be mounted to the mounting surface 130 at a top side of the mounting surface 130. In other embodiments, an air compressor can be mounted at different locations along a fill kit, including, for example, along support members of the frame 102, at a base plate of a fill kit, etc. As further illustrated, the air compressor can include a motor 138 for generating an air pressure, an outlet 158 for outputting the pressurized air to downstream components (e.g., via air hose 167, shown in FIG. 2). In some cases, air compressors of a fill kit can include pressure regulation elements to maintain a fill pressure below a threshold fill pressure, to prevent damage to components receiving the pressurized air, and additionally, to liquid cooling circuits with pressure regulated by the components. As shown, the air compressor 138 can include a pressure regulation knob 160 as can allow an operator to manually set a maximum filling pressure for the pressure regulator (e.g., a maximum pressure at which to charge downstream components). In some embodiments, a pressure regulator for an air compressor is electrically controlled, and an operator of the fill kit can set the pressure at a control panel (not shown) a screen (not shown), or other user interfaces of the fill kit.

Systems can be provided for a fill kit to supply power to electronic components of the fill kit. For example, a fill it can require conversion of an AC signal from a facility to a DC power to power electrical elements of the fill kit (e.g., the pump 120 and the air compressor 138). As further illustrated in FIG. 7, the fill kit 100 can include a power supply unit 132 which can receive an AC power (e.g., 100V-240V of AC power) at inlet 156 and can convert the power to a DC voltage (e.g., 12 V) to power the compressor 138 and the pump 120). In some embodiments, a fill kit can be cordless, and can include a battery to power electrical components of the fill kit. As shown, the power supply unit can include switches 134, 136, to selectively enable power to components of the fill kit 100. For example, in the illustrated embodiment, the switch 134 is a switch to selectively provide power to the pump 120, and switch 136 is a switch to selectively provide power to the air compressor 138. In some embodiments, switches can be provided on an operating panel including a plurality of controls. For example, an operating panel can include a control for a speed of one or more of a liquid pump of the fill kit, a speed control of an air compressor, a pressure regulation control for either or more of the pump and the air compressor, an emergency shutoff, an operating mode selection control (e.g., to control valves of the liquid fill kit), etc.

Figure 8:
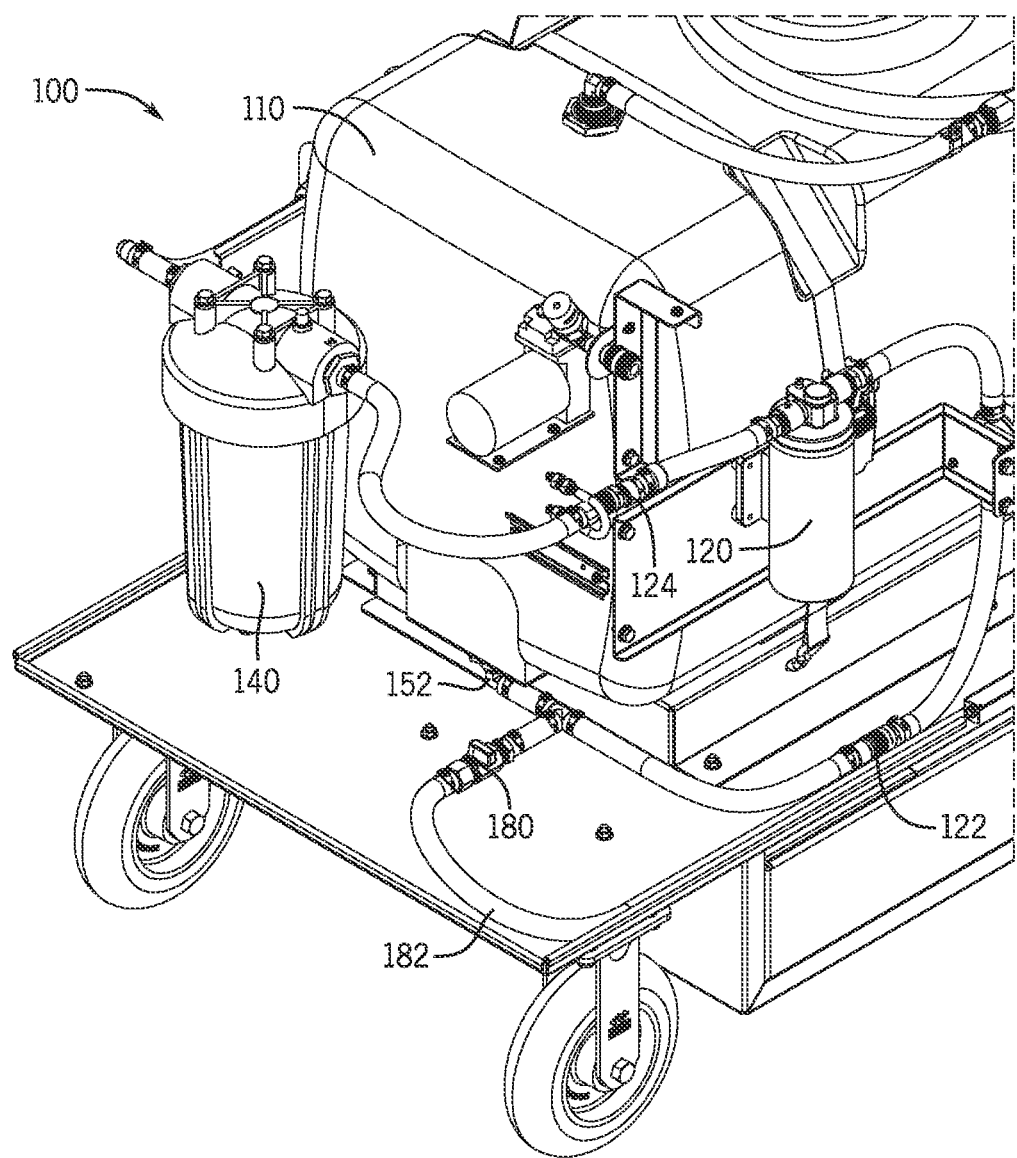
FIG. 8 is a partial front isometric view of the fill kit of FIG. 1, with rails of the frame of the fill kit, and support elements removed to show plumbing elements of the fill kit.
Figure 9:
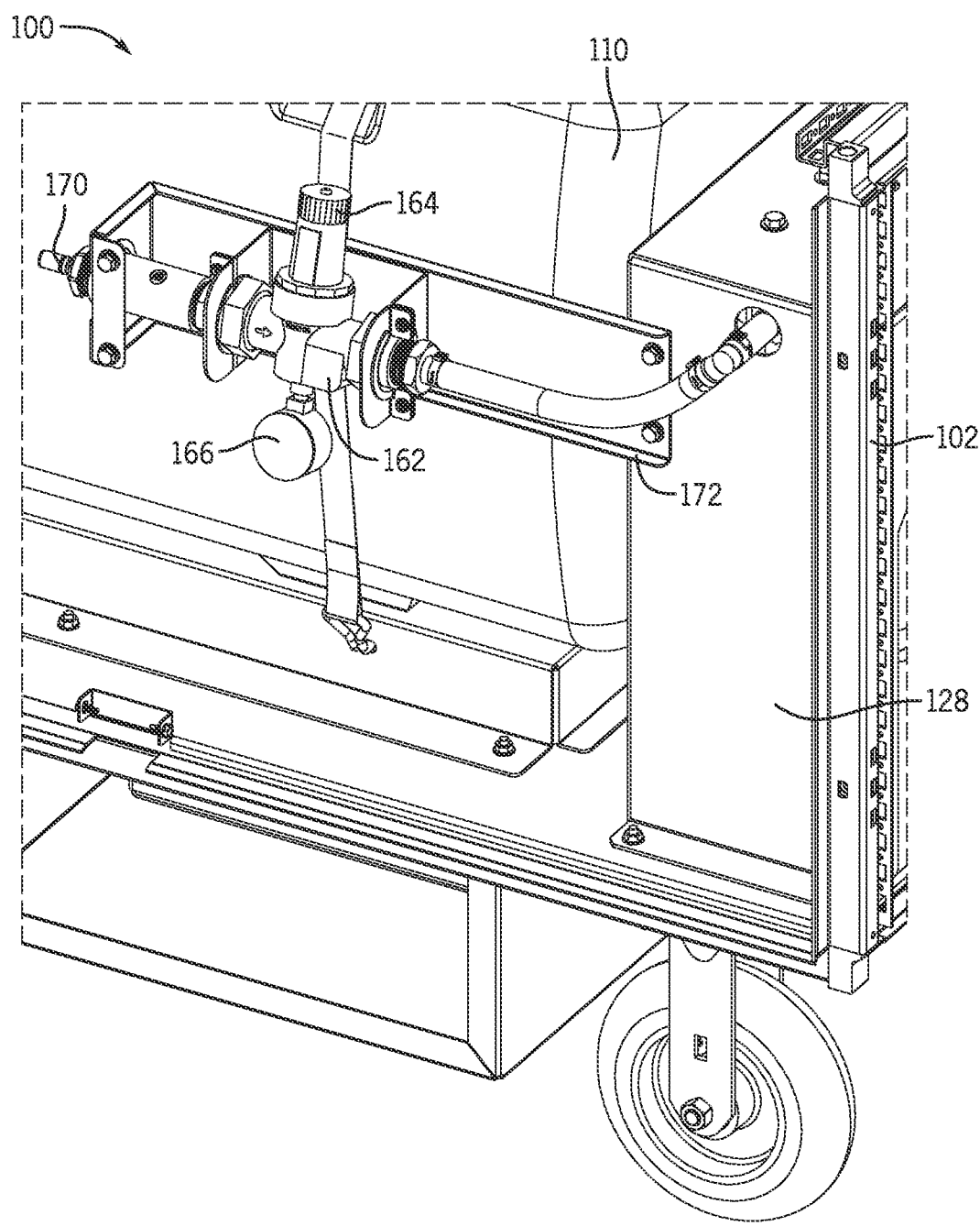
FIG. 9 is a partial left isometric view of the fill kit of FIG. 1, showing a pressure regulator of the fill kit.

Turning now to FIG. 8, a drain line can be provided for a fill kit to allow draining of fluid from the tank 110. As shown, a liquid drain valve 180 can be provided immediately downstream of the tank outlet 152. In the illustrated embodiment, the drain valve 180 is a ball valve, which can be manually alternated between a closed configuration and an open configuration. In some cases, a drain valve for a fill kit can be any known valve type. The drain valve 180 can be fluidly connected to a drain line (e.g., ½ inch hosing) and when the drain valve is opened, it can allow free flow of fluid from the tank 110 to drain the fluid therefrom. In some embodiments, the drain valve can be operated electronically (e.g., at a control panel of the fill kit).

Figure 10:
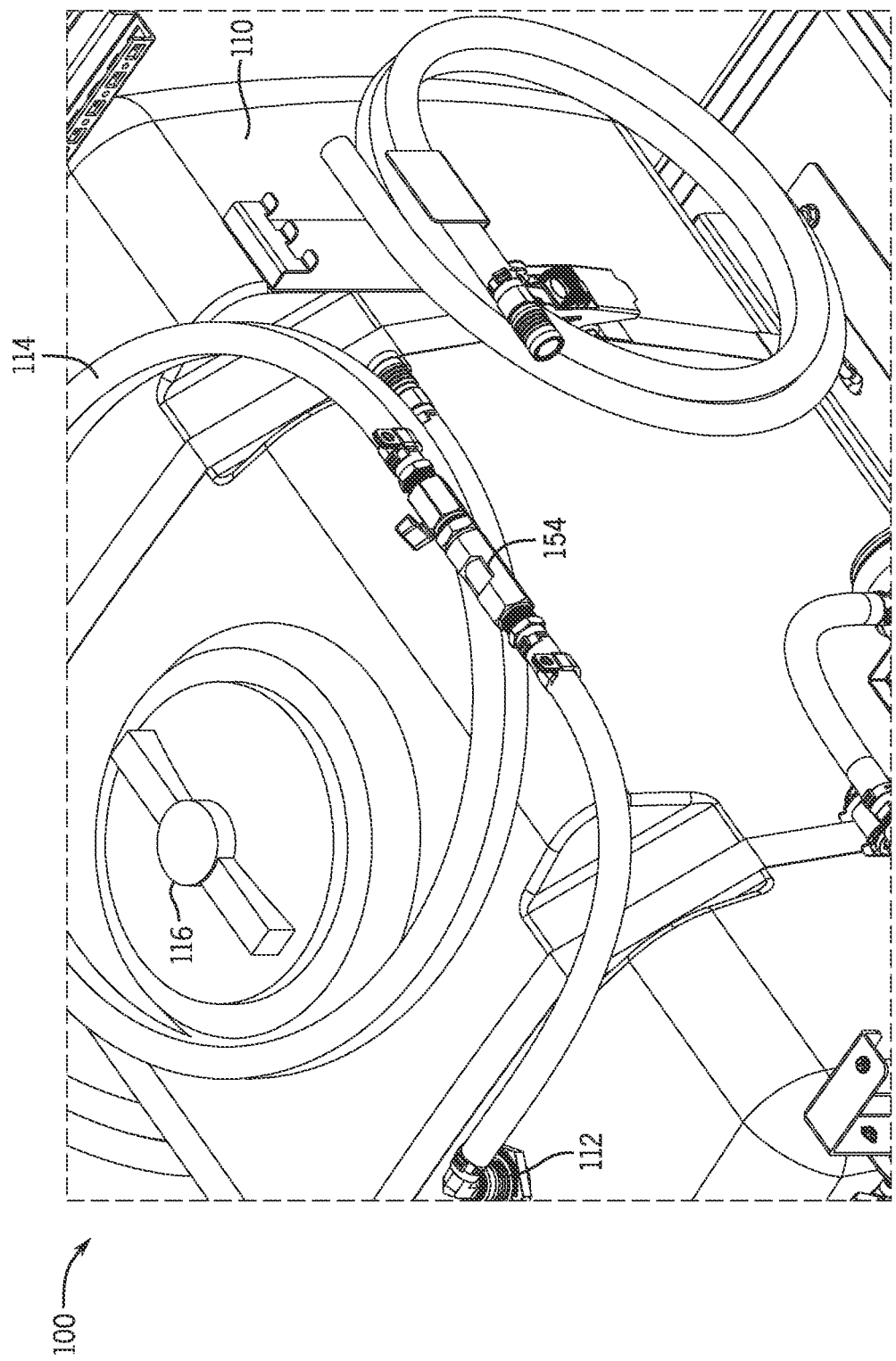
FIG. 10 is a partial top isometric view of the fill kit of FIG. 1, illustrating a sight glass in piping of the fill kit, according to some embodiments.

In some cases, a fill kit (e.g., the fill kit 100) can be operated in an air purge mode to purge air from a liquid in a liquid cooling circuit. For example, a fill kit can pump a fluid through the component of the liquid cooling circuit, and liquid from the component can be returned to a tank of the fill kit (e.g., to tank 110 through hose 114). A fill kit can include features for monitoring an air level (e.g., air bubbles) in a fluid returned from a component during a purging operation, to allow an operator to determine when air has been fully purged from the component. In this regard, FIG. 10 illustrates a sight glass 154 arranged along the hose 114, to allow an operator to view a fluid flowing through the sight glass 154 (e.g., through the hose 114). The hose 114 can receive a fluid from a component during a purging operation for the component, and an operator can monitor a fluid through the sight glass 154. When no air bubbles are observed through the sight glass 154, the operator can determine that the purging operation is complete.

Figure 13:
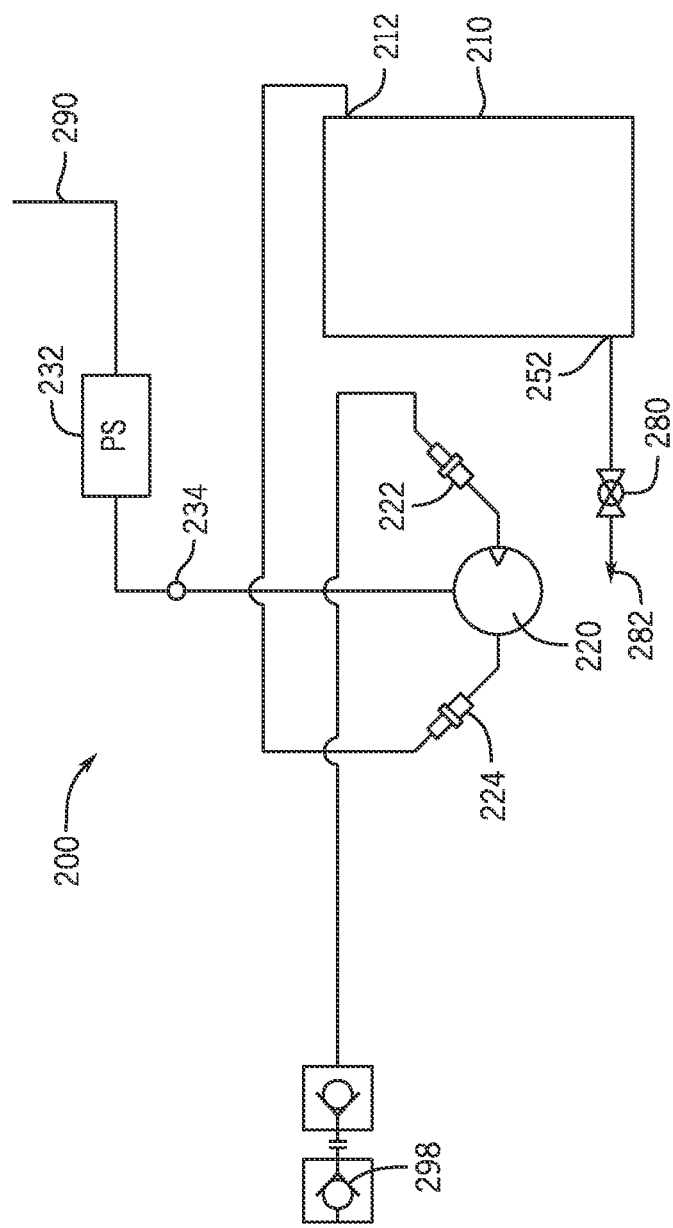
FIG. 13 is a schematic illustration of the fill kit of FIG. 11, according to an embodiment of the invention.

In some cases, as described above, a fill kit can be operated in different modes to perform different operations for fluid management in a liquid cooling circuit. For example, FIG. 11 illustrates an example fill kit 200 configured in a filling or air purging mode. The fill kit 200 can be substantially similar to the fill kit 100 and can include similar numbering for similar components. As illustrated, the fill kit includes a tank 210, a fluid pump 220, a filter 240 and a pressure regulator 262. The pump receives a power from a power supply unit 232 connected to an AC power supply (e.g., as described above), and a switch 234 is provided to selectively power the pump 220. In the illustrated embodiment, a suction-side connection interface 222 is in fluid communication with the tank 210, and a discharge-side connection interface 224 is upstream of each of the filter 240 and the pressure regulator 262. In the illustrated embodiment, the connection interfaces comprise quick disconnect fittings. Other configurations are possible, and connection interfaces for a liquid fill kit can include valves, for example (as illustrated in FIG. 13). As further illustrated, fluid can flow from the fill kit 200 to a return side connection 298 of a component to be filled with fluid (e.g., a pumping unit, heat exchanger, coolant distribution unit, server shelf, manifold, etc.). Fluid can be returned to the fill kit at a supply side connection 296 of the component and can flow back into the tank 210 via a hosing 214 at fluid inlet 212. As shown, the hosing 214 can include a sight glass to allow an operator to monitor an air content of the fluid within the hosing 214. In some case, including where a purge is not required (e.g., in a filling more or refilling mode) the fill kit 200 is not connected to the component at the supply side 296.

In some cases, a pump of a fill kit can operate to fill the tank of the fill kit (e.g., the fill kit can be operated in a self-filling mode). For example, as shown in FIG. 12, in a self-filling mode, the suction-side connection interface of the pump 220 can be fluidly connected to a reservoir 292 to receive a fluid therefrom, and the discharge-side connection interface of the pump 220 can be in fluid communication with the fluid inlet 212 of the tank 210, so that the pump 220 pumps a fluid from the reservoir 292 to the tank 210.

Further, a fill kit can be configured in a draining mode, allowing fluid of a component to be drained into a tank of the fill kit. For example, as shown in FIG. 13, the pump 220 can be operated in a draining mode to pump fluid from a component containing a liquid coolant into the tank 210 of the liquid fill kit 200. As shown, in a draining mode, the pump 220 can be in fluid communication with a component containing a coolant at connection 298 (e.g., a drain port for a component along a liquid cooling circuit). The pump can be fluidly connected to the tank 210 at the discharge-side connection interface 224, and operation of the pump can draw a fluid from the component at connection 298 into the tank 210 at fluid inlet 212.

Figure 12:
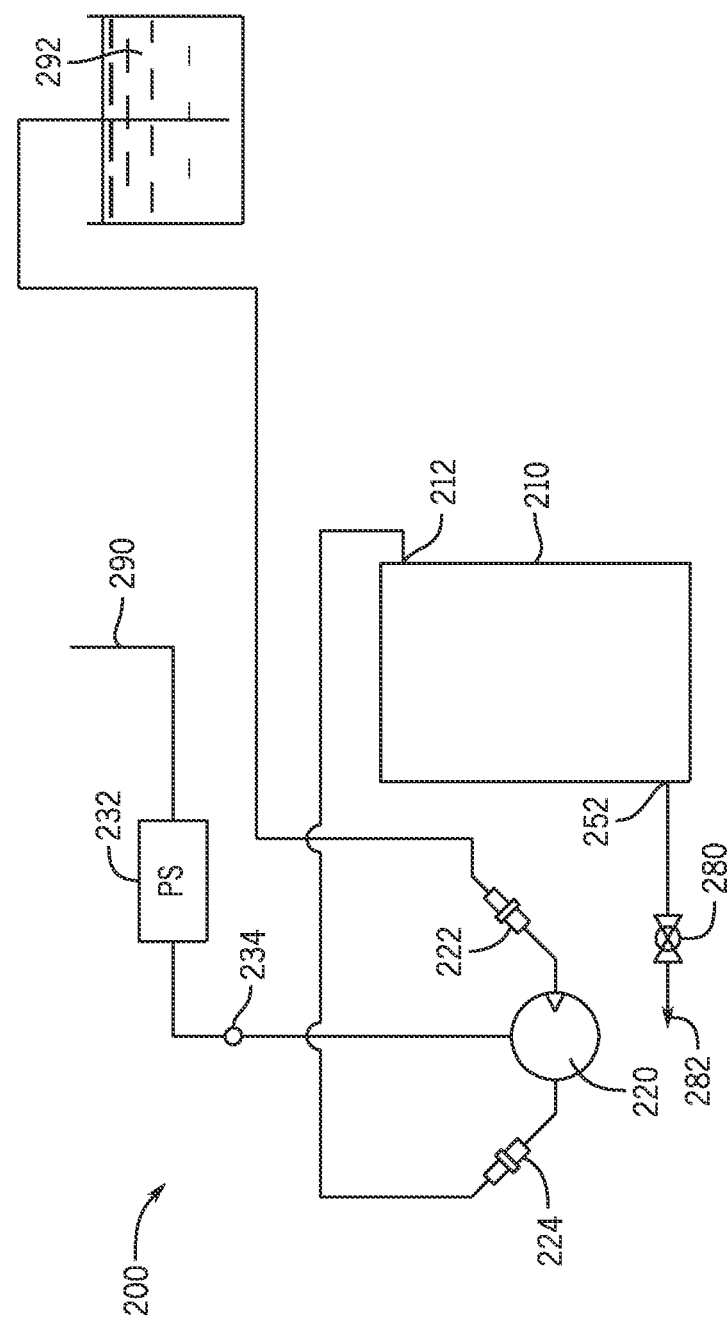
FIG. 12 is a schematic illustration of the fill kit of FIG. 11, according to an embodiment of the invention.
Figure 14:
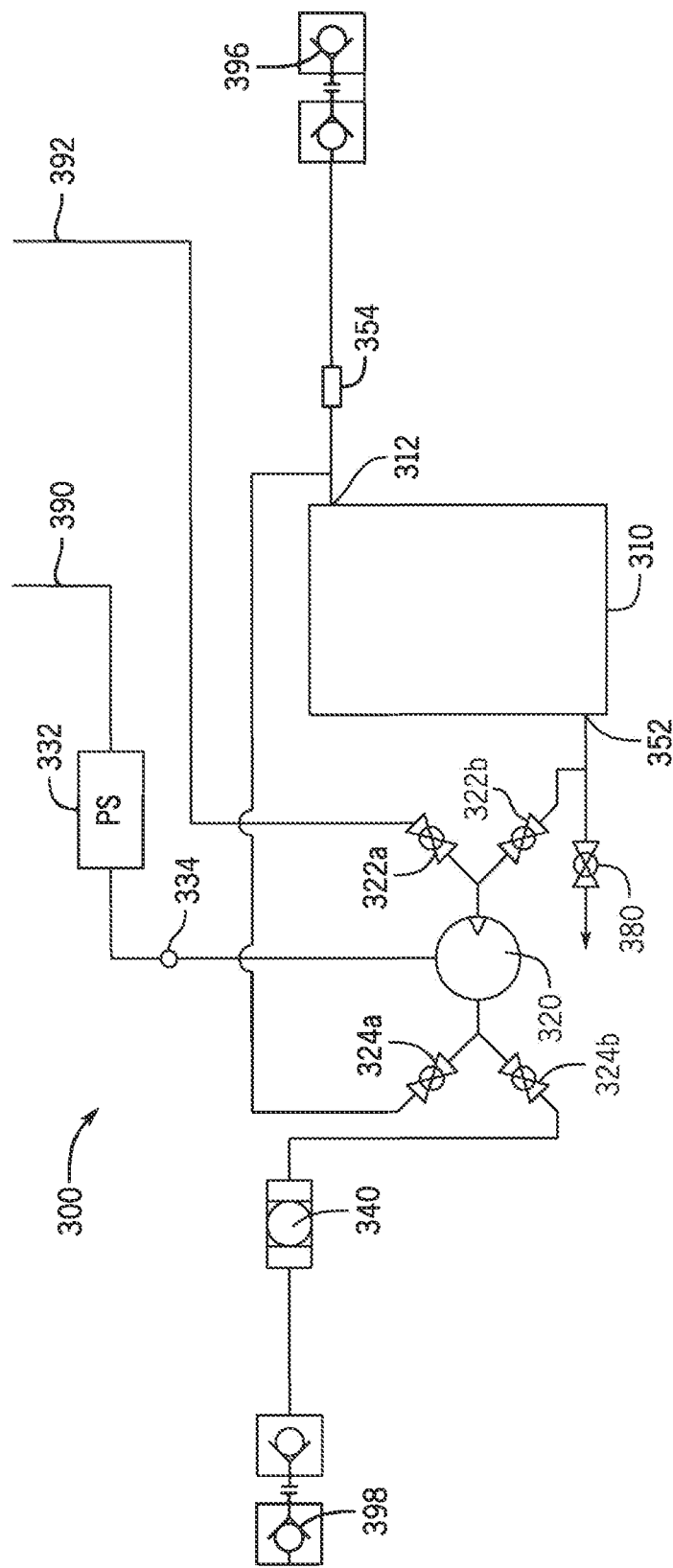
FIG. 14 is a schematic illustration of a fill kit, according to an embodiment of the invention.

FIG. 14 illustrates an embodiment of a fill kit 300 (e.g., similar to fill kit 100 shown in FIGS. 1-10 and fill kit 200 shown in FIGS. 11-13). As shown, the fill kit 300 can include a power supply 332, a tank 310, a pump 320, a filter 340, and a drain valve 380, a sight glass 354, a fluid reservoir 392, and an AC power supply 390. In the illustrated embodiment, the fill kit 300 includes a first valve 322a at a suction side of the pump 320, the first valve being configured to allow or deny flow of fluid from the reservoir 392 through the pump 320. A second valve 322b can be provided at a suction side of pump 320 to selectively allow or deny a flow of fluid from the tank 310 to the pump 220. A third valve 324a can be provided at a discharge side of pump 220 to selectively allow a fluid to flow from the pump 220 to the tank 310. A fourth valve 324b can be provided at the discharge side of the pump 320 to selectively allow a fluid to flow from the pump to the connection 398 (e.g., to a downstream component). The fill kit 300 can operate in a filling mode when valves 324a, 322a are closed and valves 324b and 322b are open, allowing fluid to flow from the tank 210 to the connection 398. Further, the fill kit can be operated in a self-filling mode when valves 324b and 322b are closed and valves 322a and 324a are open, allowing fluid flow from the reservoir 392 to the tank 310.

The invention claimed is:

1. A liquid fill kit system comprising:
    a rollable cart including a frame and a plurality of wheels;
    a tank disposed within the frame, the tank including a fluid inlet port that is selectively fluidly connected to a fluid outlet port of an electrical component;
    a fluid pump including a suction interface connection and a discharge interface connection;
    a filter assembly mounted within the frame; and
    a fluid pressure regulator including a fluid outlet port that is selectively fluidly connected to a fluid inlet port of the electrical component and a valve that stops a flow of fluid from the tank to the fluid inlet port of the electrical component when a fluid pressure exceeds a fluid pressure threshold;
    wherein, in a first configuration, the suction interface connection is in fluid communication with the tank, and the discharge interface connection is in fluid communication with the filter assembly, the fluid pressure regulator, and the fluid outlet port, and
    wherein, when the fluid pump is in operation and the fluid pressure is below the fluid pressure threshold, the flow of fluid is generated through the fluid outlet port.

2. The liquid fill kit system of claim 1, wherein the fluid pressure regulator includes a manual control, wherein a position of the manual control determines the fluid pressure threshold.

3. The liquid fill kit system of claim 1, further comprising an air compressor mounted within the frame.

4. The liquid fill kit system of claim 1, wherein the suction interface connection and the discharge interface connection are quick disconnect fittings.

5. The liquid fill kit system of claim 1, where, in a second configuration, the suction interface connection is in fluid communication with a fluid reservoir and the discharge interface connection is in fluid communication with the tank.

6. The liquid fill kit system of claim 1, wherein the tank includes a tank outlet, and wherein a drain valve is disposed downstream of the tank outlet.

7. The liquid fill kit system of claim 2, wherein the manual control includes a pressure regulation knob.

8. The liquid fill kit system of claim 1, wherein the fluid pressure regulator includes a gauge display that displays the fluid pressure flowing past the valve.

9. The liquid fill kit system of claim 1, further comprising a switch that selectively provides power to the fluid pump.

10. The liquid fill kit system of claim 1, wherein a volume of the tank is between about 20 gallons and about 60 gallons.

11. A method of charging an electrical component with a fluid coolant, the method comprising:
    providing a fill kit including a rollable frame, a fluid inlet hose, a fluid outlet hose, a tank disposed within the rollable frame, a pump, and a pressure regulator, the pressure regulator including a manual control and a valve, each of the tank, the pump, and the pressure regulator being fluidly between the fluid inlet hose and the fluid outlet hose;
    providing an electrical component having a fluid inlet port and a fluid outlet port;
    setting, at the pressure regulator via the manual control, a pressure threshold;
    fluidly connecting the fluid inlet hose to the fluid outlet port;

fluidly connecting the fluid outlet hose to the fluid inlet port;

inducing, by the pump, a flow of fluid from the tank to the fluid inlet port through the fluid inlet hose; and when a fluid pressure meets or exceeds the pressure threshold, closing the valve, wherein closing the valve stops the flow of fluid from the tank to the fluid inlet port.

12. The method of claim 11, wherein the manual control comprises a rotatable knob.

13. The method of claim 11, wherein both of the fluid inlet hose and the fluid outlet hose comprise quick-disconnect fittings.

14. The method of claim 11, further comprising filling the tank, wherein filling the tank includes inducing, by the pump, a flow of fluid from a reservoir to the tank.

15. The method of claim 11, wherein the fluid inlet hose includes a sight glass.

16. A liquid fill kit system comprising:
a rollable cart including a frame and a plurality of wheels;
a tank disposed within the frame;
a fluid outlet;
the tank including a fluid inlet that is slectively fluidly connected to a fluid outlet port of an electrical component;
a fluid pump including a suction interface connection and a discharge interface connection; and
a fluid pressure regulator including a valve that closes in response to a fluid pressure exceeding a fluid pressure threshold;

wherein, in a first configuration, the suction interface connection is fluidly downstream of the tank, and the discharge interface connection is fluidly upstream of the fluid pressure regulator and the fluid outlet, wherein, when the fluid pressure is below the fluid pressure threshold, a liquid coolant flows between the tank and the fluid outlet to provide the liquid coolant to the electrical component, and wherein when the fluid pressure meets or exceeds the fluid pressure threshold, the flow of the liquid coolant is stopped between the tank and the fluid outlet.

17. The liquid fill kit system of claim 16, wherein the fluid pressure regulator includes a manual control wherein the fluid pressure threshold is determined by a position of the manual control.

18. The liquid fill kit system of claim 16, further including a return hose in fluid communication with the tank, the return hose including a sight glass.

19. The liquid fill kit system of claim 16, further comprising a filter fluidly upstream of the fluid pressure regulator.

20. The liquid fill kit system of claim 16, wherein the electrical component is one or more of:
a pumping unit;
a heat exchanger;
a coolant distribution unit;
a server shelf; or
a manifold.

* * * * *